United States Patent
Satyanarayanan et al.

(10) Patent No.: US 7,836,169 B2
(45) Date of Patent: Nov. 16, 2010

(54) METHOD AND SYSTEM FOR IDENTIFYING AND REPORTING OVER-UTILIZED, UNDER-UTILIZED, AND BAD QUALITY TRUNKS AND GATEWAYS IN INTERNET PROTOCOL TELEPHONY NETWORKS

(75) Inventors: Ottalingam Thangaraj Satyanarayanan, Fremont, CA (US); Neil Anil Prasad, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 699 days.

(21) Appl. No.: 11/626,793

(22) Filed: Jan. 24, 2007

(65) Prior Publication Data

US 2008/0175167 A1    Jul. 24, 2008

(51) Int. Cl.
*G06F 15/173* (2006.01)

(52) U.S. Cl. .................. 709/224; 709/201; 709/220; 709/223; 370/252

(58) Field of Classification Search ............... 370/252, 370/253, 338, 352–356, 401
See application file for complete search history.

(56) References Cited

U.S. PATENT DOCUMENTS

| 4,456,788 | A | * | 6/1984 | Kline et al. ................. 379/137 |
| 5,832,196 | A | * | 11/1998 | Croslin et al. .................. 714/4 |
| 6,269,401 | B1 | * | 7/2001 | Fletcher et al. ............. 709/224 |

(Continued)

FOREIGN PATENT DOCUMENTS

EP    0948165 A1    6/1999

OTHER PUBLICATIONS

MSE—Transition from Voice to Data, Jack Baker, Rich Joy, John Krause, Nelson Rodrigues and Joe Young, Engineering, GTE Government Systems Corporation, IEEE, 1993.

(Continued)

*Primary Examiner*—Hong Cho
*Assistant Examiner*—Ajay P Cattungal
(74) *Attorney, Agent, or Firm*—Marger Johnson & McCollom, P.C.

(57) ABSTRACT

A method to identify and report over-utilized, under-utilized, and bad quality trunks and gateways in an Internet Protocol (IP) telephony network includes collecting information associated with a plurality of gateways and trunks on the gateways, as well as correlating the information with network topology and configuration data obtained from a network management system. The collected information may be used to compute traffic statistics associated with the gateways and trunks on the gateways. The method further includes identifying over-utilized, under-utilized, and/or bad quality trunks or gateways, if any; and generating a report to display the over-utilized, under-utilized, and/or bad quality trunks or gateways, e.g., a report to display a subset of the plurality of gateways or trunks for potential upgrade or downgrade.

A system to identify and report over-utilized, under-utilized, and bad quality trunks and gateways in an Internet Protocol (IP) telephony network is also claimed and described herein.

19 Claims, 6 Drawing Sheets

U.S. PATENT DOCUMENTS

| | | | |
|---|---|---|---|
| 2001/0021186 A1* | 9/2001 | Ono et al. | 370/352 |
| 2003/0020764 A1* | 1/2003 | Germain et al. | 345/853 |
| 2003/0074358 A1* | 4/2003 | Sarbaz et al. | 707/10 |
| 2004/0061701 A1* | 4/2004 | Arquie et al. | 345/440 |
| 2005/0018602 A1* | 1/2005 | Labovitz | 370/229 |
| 2005/0129026 A1* | 6/2005 | Chang et al. | 370/395.2 |
| 2006/0129499 A1* | 6/2006 | Combar et al. | 705/64 |
| 2006/0146784 A1* | 7/2006 | Karpov et al. | 370/351 |
| 2007/0214412 A1* | 9/2007 | Arquie et al. | 715/526 |

OTHER PUBLICATIONS

CA Network Management Solution, Managing Network Performance with eHealth Software, Informational Pamphlet, 2006, pp. 1-6, CA, Islandia, NY.

NetIQ Corporation, Vivinet Diagnostics, Pinpoints VoIP quality problems in minutes and creates informative reports, Informational Pamphlet, 2005, pp. 1-2, NetIQ, San Jose, CA.

* cited by examiner

METHOD AND SYSTEM FOR IDENTIFYING AND REPORTING OVER-UTILIZED, UNDER-UTILIZED, AND BAD QUALITY TRUNKS AND GATEWAYS IN INTERNET PROTOCOL TELEPHONY NETWORKS

TECHNICAL FIELD

The present disclosure relates generally to communication networks, and more particularly to a method and system for identifying and reporting over-utilized, under-utilized, and bad quality trunks and gateways in Internet Protocol (IP) telephony networks.

BACKGROUND

The process of deploying and operating IP telephony networks and services is often complex and raises several challenges and problems. Companies deploying such networks and services need information to determine which network resources (e.g. voice gateways and trunks on these gateways) are over-utilized or under-utilized, and thus identify which trunks or gateways are the top candidates for upgrade or downgrade procedures. Furthermore, adequate data is required as to what additional network capacity is needed and when it is needed for a particular trunk or gateway. This information is critical and relevant for many organizations, as they have contractual and financial agreements with service providers for long-distance PSTN and WAN services across specific trunks. Techniques to identify which trunks have problems related to capacity and whether the trunks are under-utilized or over-utilized can save companies a significant amount of money. Additionally, techniques to estimate future capacity and utilization on trunks and gateways may help the operations personnel to be more effective in budgetary planning for trunk and gateway upgrades and network changes and enable them to proactively fix potential problems in the future, thereby preventing such problems from becoming critical and service-impacting.

Some trunks in the network may have voice quality problems associated with them. It is important to identify these bad quality trunks for troubleshooting and proactively resolving the problems to ensure service quality is not affected. But such identification may not be easy or obvious using traditional network voice quality probes or softswitch (e.g. Cisco Unified CallManager) Call Detail Record (CDR) analysis. (CDRs contain information about the endpoints of the call and other call control/routing aspects. Softswitches can also generate Call Management Records (CMRs) that contain information about the quality of the streamed audio of the call).

Therefore, it is beneficial to provide tools and methods for network operators and administrators to identify over-utilized, under-utilized, and bad quality trunks and gateways in IP telephony networks.

DESCRIPTION OF EXAMPLE EMBODIMENTS

Overview

A method to identify and report over-utilized, under-utilized, and bad quality trunks and gateways in an IP telephony network includes collecting information associated with a plurality of gateways and trunks on the gateways and computing traffic statistics associated with the plurality of gateways and trunks based on the collected information. The information is then correlated with network topology and configuration data obtained from a network management system. The method further includes identifying over-utilized, under-utilized, and/or bad quality trunks or gateways, if any; and generating a report to display the over-utilized, under-utilized, and/or bad quality trunks or gateways.

A system to identify and report over-utilized, under-utilized, and bad quality trunks and gateways in an IP telephony network includes a data collection system, a network management system, and a statistics analysis and reporting system. The statistics analysis and reporting system includes means for computing traffic statistics associated with the plurality of gateways and trunks based on the collected information. The system further includes means for correlating the information with the network topology and configuration data obtained from the network management system, and means for identifying over-utilized, under-utilized, and/or bad quality trunks or gateways, if any; and means for generating reports to display the over-utilized, under-utilized, and/or bad quality trunks or gateways.

BRIEF DESCRIPTION OF THE DRAWINGS

The foregoing and other objects, advantages and features will become more readily apparent by reference to the following detailed descriptions in conjunction with the accompanying drawings.

DETAILED DESCRIPTION

Figure 1:
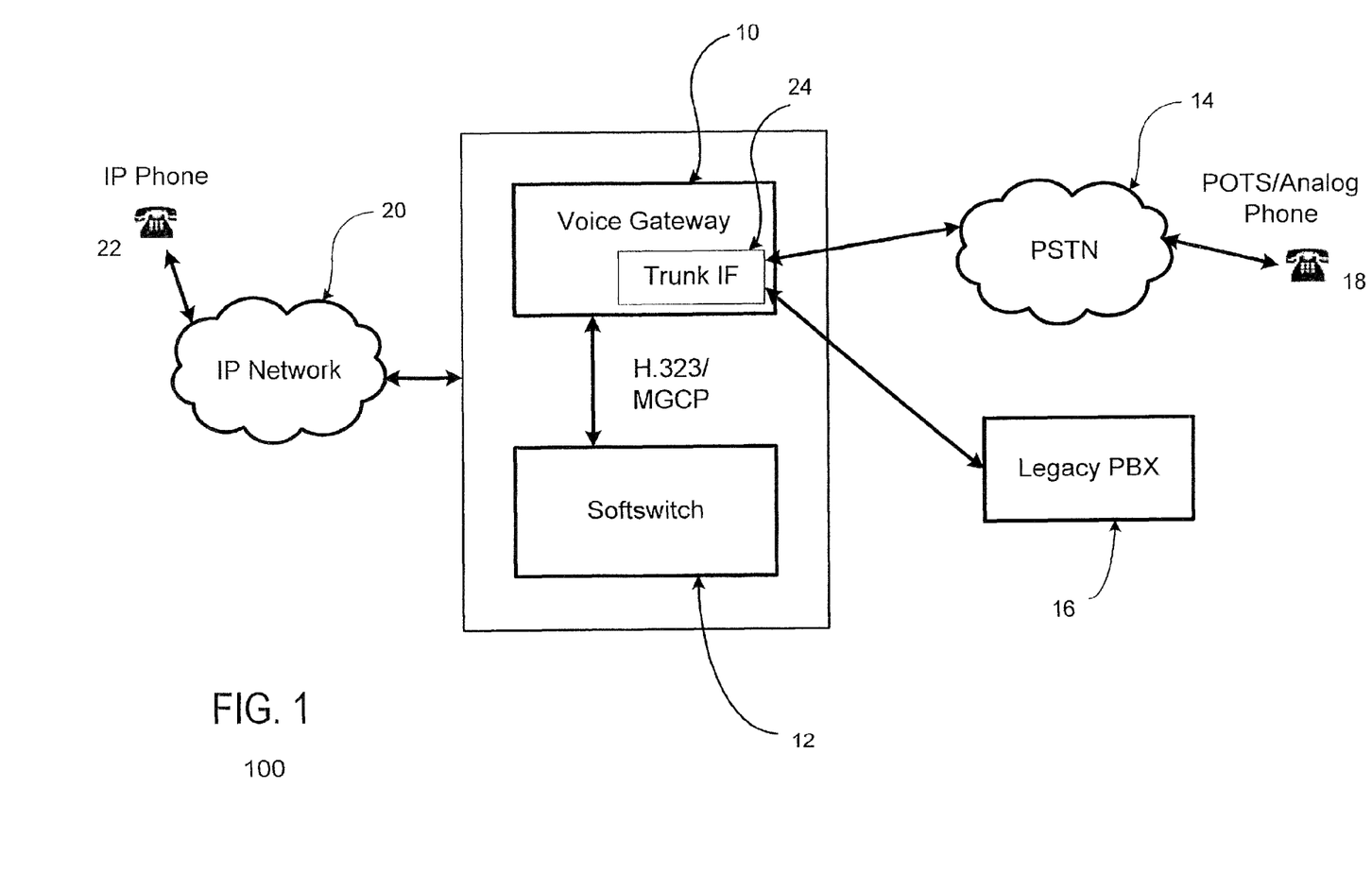
FIG. 1 is a schematic block diagram illustrating an example IP telephony network.

FIG. 1 is a schematic block diagram illustrating an example IP telephony network 100. The IP telephony network 100 consists of three major components: (1) voice gateway 10, e.g., Cisco Internetwork Operating System (IOS) voice gateway; (2) Softswitch 12, e.g., Cisco Unified CallManager (CCM); and (3) IP network 20.

Softswitch 12 is responsible for signaling and control services that coordinate the gateway functions, such as call setup, billing and accounting, security and admission control, call routing, and number conversion among others. Gateway 10 is responsible for call origination, call detection, and encoder-decoder (CODEC) functions, including at least analog-to-digital conversion and voice packet creation. Gateway 10 allows voice data to be transported across the IP network 20. Specifically, Gateway 10 includes a trunk interface (trunk IF) 24 that connects to traditional telephone trunks or analog and digital devices. The trunks are connected to the Public Switched Telephone Network (PSTN) 14, the legacy Private Branch Exchange (PBX) system 16, and/or the legacy telephone 18. In one example implementation, gateway 10 communicates with Softswitch 12 using H.323, which is a protocol commonly used in Voice over IP (VoIP, Internet Telephony, or IP Telephony) and IP-based videoconferencing. In H.323 mode, gateway 10 (also called H.323 gateway) acts as an intelligent gateway device. In another example implementation, gateway 10 communicates with Softswitch 12 using Media Gateway Control Protocol (MGCP). In MGCP mode, gateway 10 (also called MCGP gateway) operates as a stateless client, giving Softswitch 12 (e.g., Cisco Unified CallManager) full control.

Figure 2:
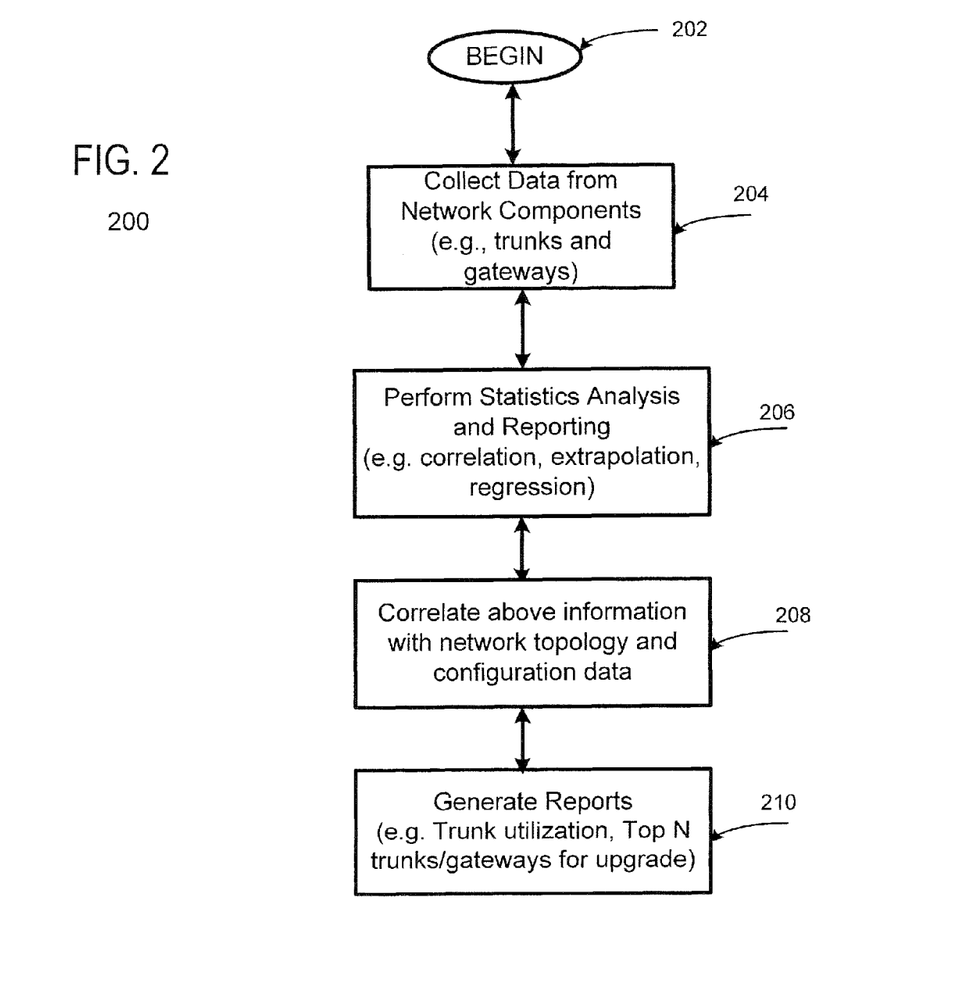
FIG. 2 is a flow chart illustrating an example method for identifying and reporting over-utilized, under-utilized, and bad quality trunks and gateways in the IP telephony system of FIG. 3.

FIG. 2 is a flow chart illustrating an example method 200 for identifying and reporting over-utilized, under-utilized, and bad quality trunks and gateways in the IP telephony system of FIG. 3, which will be described later.

Method 200 begins with step 202. In step 204, method 200 collects data from various network components, such as the trunks and gateways in the IP telephony system of FIG. 3. In one example implementation, such data collection may be accomplished using appropriate software, such as the operational statistics collection software, the billing & usage statistics collection software, etc. More details on data collection will be described later in FIGS. 4, 5, and 6. In step 206, statistics analysis and reporting are performed. Standard statistics techniques (e.g., correlation, extrapolation, and regression) may be used to obtain useful traffic statistics based on the collected data, such as the number of days for a particular trunk to reach 100% capacity. In step 208, the above network traffic information is correlated with the network topology and configuration data obtained from a network management system (e.g., Cisco Unified Operations Manager) to effectively determine bad quality trunks, estimate capacity needs and optimize gateways and trunks operation. Such network topology and configuration data may include:

IP addresses and other identifying information for the gateways
Trunks contained in the gateways
Collection of gateways in a route group
Dialing patterns that are routed through the route group.

In step 210, method 200 generates various reports on network traffic statistics information, such as trunk utilization, trunk capacity estimation, top N (N is a subset of the total number trunks/gateways in the network) trunks/gateways for potential upgrade, top N trunks/gateways with the longest idle time, top N trunks/gateways with persistent voice quality issues, etc.

Figure 3:
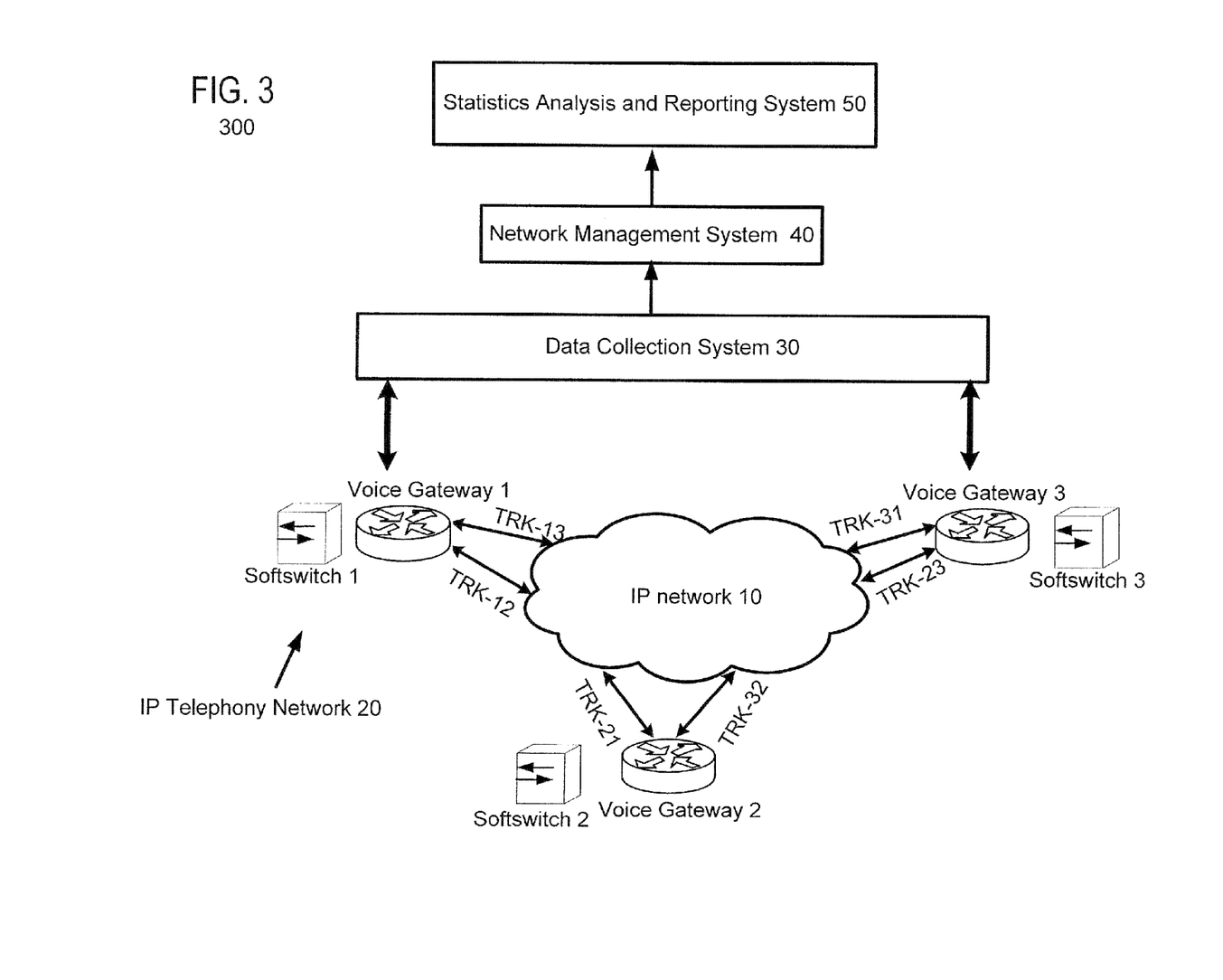
FIG. 3 is a schematic diagram illustrating an example IP telephony system implementing the methods according to FIGS. 2, 4, 5, and 6.

FIG. 3 is a schematic block diagram illustrating an example IP telephony system 300 implementing the methods according to FIGS. 2, 4, 5, and 6.

The IP telephony system 300 includes IP telephony network 20. The underlying IP telephony network 20 consists of IP voice gateways 1, 2, and 3 (e.g., Cisco Internetwork Operating System (IOS) voice gateways), which allow voice traffic to be transported across the IP network 10. The voice gateways have multiple trunk interfaces on them which enable them to route calls to each other through IP network 10. For example, as shown in FIG. 3, voice gateway 1 has a trunk interface labeled "TRK-12" that is connected to IP network 10. Similarly, voice gateway 2 has a trunk interface labeled "TRK-21" that is connected to IP network 10. These connections enable the voice gateways to transmit and receive calls through these trunks via IP network 10. Associated with each voice gateway, is a softswitch (e.g., Cisco Unified CallManager or CCM) that controls and coordinates the gateway functions. The softswitch is responsible for call setup, billing and accounting, security and admission control, call routing, and number conversion among other functions.

Example system 300 also includes data collection system 30 to collect various network traffic data from the underlying IP telephony network 20 (e.g., trunk utilization, overflow call volume). Other components of system 300 may include network management system 40 (e.g., Cisco Unified Operations Manager) for obtaining operation statistics and billing and usage information, and statistics analysis and reporting system 50, as shown in FIG. 3. The statistics analysis and reporting system 50 is configured to compute useful traffic statistics (e.g., the number of days for a particular trunk to reach 100% capacity) based on the collected data using standard statistics techniques (e.g., correlation, extrapolation, and regression) and correlation with network configuration and topology information obtained from a network management system (e.g. Cisco Unified Operations Manager). The statistics analysis and reporting system 50 may also be configured to generate various reports on network traffic statistics information, such as trunk utilization, trunk capacity estimation, top N (N is a subset of the total number trunks/gateways in the network) trunks/gateways for potential upgrade, top N trunks/gateways with the longest idle time, top N trunks/gateways with persistent voice quality issues, etc.

Figure 4:
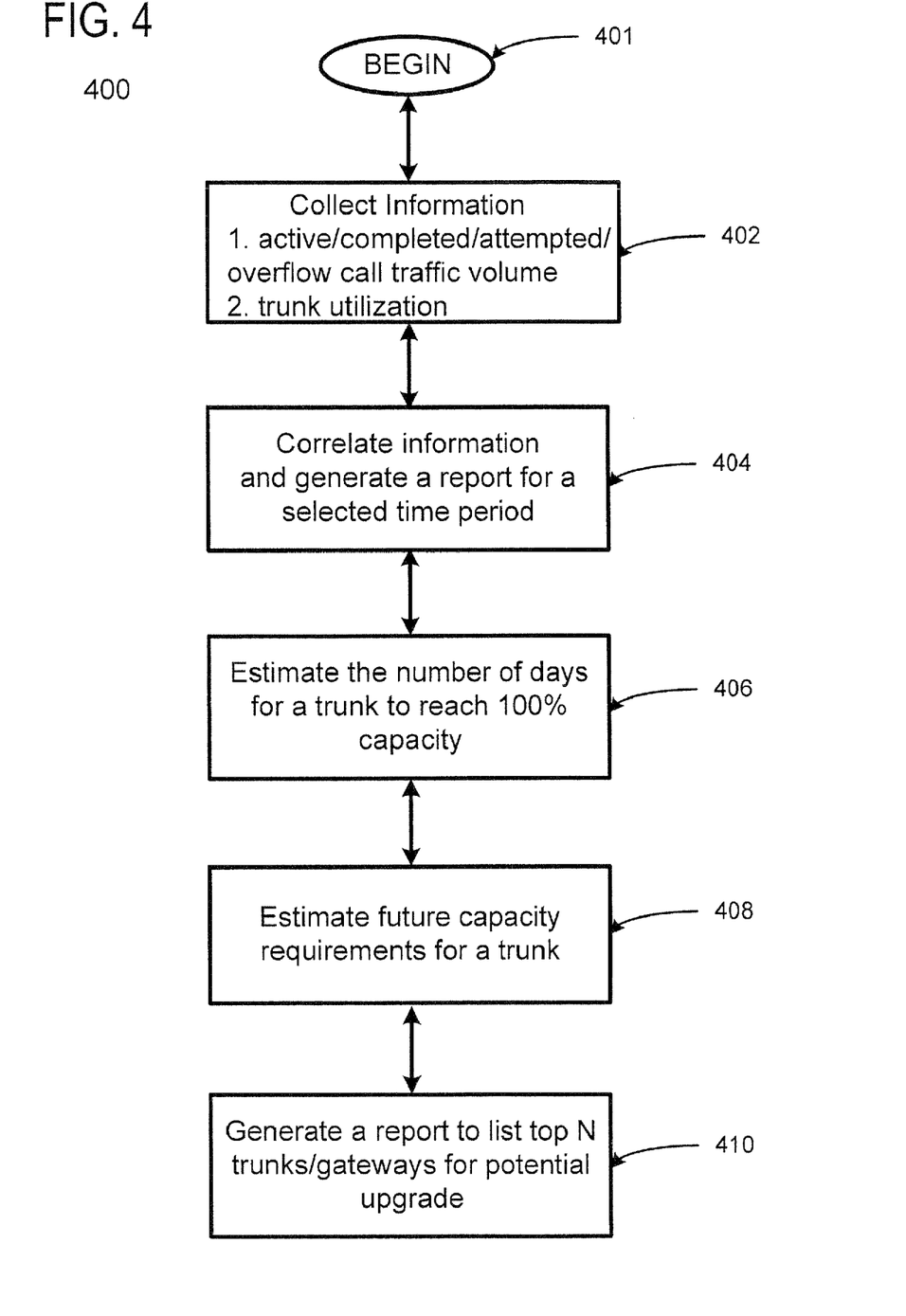
FIG. 4 is a flow chart illustrating an example method for analyzing and reporting trunk utilization and identifying under-utilized and/or over-utilized trunks or gateways in the IP telephony system of FIG. 3.

FIG. 4 is a flow chart illustrating an example method 400 for identifying and reporting over-utilized, under-utilized, and bad quality trunks and gateways in the IP telephony system of FIG. 3.

Method 400 begins with step 401. At step 402, information associated with the trunks and gateways is collected. The information may include active, completed, attempted, overflow call volume, and actual trunk utilization, etc. In one example implementation, information on active calls, completed calls, attempted calls, and overflow calls may be obtained by polling Cisco Unified CallManager (CCM) performance objects for a particular voice gateway (e.g., H.323 or MGCP gateway), such as the following:

CISCO MGCP FXS DEVICE

CISCO MGCP FXO DEVICE

CISCO MGCP PRI DEVICE

CISCO MGCP T1 CAS DEVICE

CISCO H323

Information on trunk utilization for MGCP gateways may be obtained by polling Cisco MGCP Gateways performance object on Cisco Unified CallManager (CCM). For H.323 gateways, information on trunk and CPU utilization may be obtained by polling various Management Information Bases or MIBs (i.e., a database of objects resident on the gateway device that can be monitored by a network management system), depending on the particular piece of device hardware deployed. The MIBs may include the following objects:

CISCO-PROCESS-MIB

IF-MIB

CISCO-VOICE-IF-MIB

ISDN-MIB

TABLE 1

Trunk Utilization Report for all Gateways on Sep. 15, 2006

| Gateway | Trunk | Trunk Utilization % | Outbound Busy Attempts | Number of Calls | Total duration (sec.) | Service Provider | Per-minute cost, $ | Total cost |
|---|---|---|---|---|---|---|---|---|
| 1 | TRK-12 | 78% | 4892 | 49229 | 9,835,452 | AT&T | $0.33 | $54,095 |
| 2 | TRK-23 | 67% | 472 | 10292 | 737,373 | Sprint | $0.12 | $ 4,056 |
| 3 | TRK-13 | 55% | 711 | 9339 | 572,999 | MCI | $0.24 | $ 2,292 |

TABLE 2

TRK-12 Capacity Estimation in 2006

| Month | Trunk Utilization % |
|---|---|
| January | 44% |
| February | 47% |
| March | 51% |
| April | 55% |
| May | 59% |
| June | 64% |
| July | 68% |
| August | 73% |
| September | 79% |
| October | 85% |
| November | 91% |
| December | 97% |

CISCO-POP-MGMT-MIB

CISCO-CAS-IP-MIB

DIAL-CONTROL-MIB

At step 404, the information collected is correlated with the network topology and configuration data obtained from the network management system (e.g., Cisco Unified Operations Manager) to generate a variety of reports on an hourly, daily, weekly, monthly, or yearly basis that correlate the trunk utilization with call volume and call overflow volume. For example, Table 1 is an example daily report on trunk utilization and cost for the IP telephony system in FIG. 3.

Referring to Table 1, the column marked as "Outbound busy attempts" represents call overflow volume for the particular trunk, whereas the column marked as "Number of calls" represents the total call volume on that trunk. For TRK-12, the number of outbound busy attempts and the number of calls are significantly more than those for the other trunks. These numbers correlate well with the trunk utilization rate; for instance, TRK-12 has a utilization of 78% as compared to 67% utilization for TRK-23, and 55% for TRK-13.

In addition to the network traffic statistics analysis described in Table 1, method 400 can also incorporate cost and business data into the analysis. The cost and business data may include information such as the service provider associated with a particular trunk, the associated service rates, and the computed costs, as shown in the last three columns of Table 1. The additional information would significantly add value to these reports by highlighting the business and financial costs associated with a specific trunk, and provide guidance for business decisions on upgrading or downgrading and/or changing service providers for specific problematic trunks that may have high cost and utilization, call volume, and/or call overflow volume problems.

At step 406, standard extrapolation and regression techniques may be used to estimate the number of days needed for a particular trunk to reach 100% capacity. At step 408, the above estimation is combined with the call overflow volume to estimate the future capacity requirements for the trunk or gateway for a potential upgrade. For example, Table 2 shows the actual and estimated trunk capacity for TRK-12 in 2006.

Referring to Table 2, the numbers from January to September represent the actual trunk utilization, whereas the numbers from October to December represent estimations for trunk utilization using extrapolation and regression techniques. The estimations indicate that TRK-12 almost reaches 100% capacity by December, thus making it a top candidate for an upgrade.

At step 410, a report is generated to list the top candidates for potential upgrade based on the information and analysis performed above. For example, Table 3 ranks the trunks from 1 to 3, with 1 indicating that a particular trunk should be the first among all to receive an upgrade. For instance, the estimated utilization of capacity for TRK-12 is 98% as of Dec. 15, 2006, thus making it the number one candidate for an upgrade. Table 3 also includes information that predicts when a trunk might cross a user-defined threshold. For example, as shown in Table 3, TRK-12 has already crossed the user-defined threshold, whereas for TRK-13, it may take approximately 93 days to cross the same user-defined threshold.

Similarly, we can identify which trunks or gateways are under-utilized and then generate a report to display the top N (N is a subset of the total number of trunks or gateways in the network) trunks or gateways for a potential downgrade.

TABLE 3

Trunk Upgrade Candidates Across All Gateways for Entire IP Telephony deployment, As Of Dec. 15, 2006

| Rank | Trunk | Gateway | Current Trunk Utilization % | Outbound busy attempts as % of total calls | % within User-defined Threshold | Days to Reaching Threshold |
|---|---|---|---|---|---|---|
| 1 | TRK-12 | 1 | 98% | 43% | 0% (Crossed) | 0 (Crossed) |
| 2 | TRK-23 | 3 | 81% | 15% | 82% | 45 |
| 3 | TRK-13 | 2 | 77% | 5% | 55% | 93 |

So far, we've described an example method to identify the top N trunks or gateways for potential upgrade or downgrade in the IP telephony system of FIG. 3 based on trunk utilization and overflow call volume. Further information may also be included in the computation to identify potential upgrade or downgrade trunks or gateways, which may include the idle time for the gateways, trunk groups, trunks or channels being monitored, the system (CPU, Memory and disk) utilization, and whether there is a violation of a user-defined Service Level Agreement (SLA) threshold for traffic counters, etc. The additional information may then correlate with the network topology and configuration data obtained from a network management system (e.g., Cisco Unified Operations Manager) to generate reports on backup routes/trunks that are over-utilized or under-utilized or on destinations that are infrequently-called. The above information is vital for companies to improve connectivity and reduce costs associated with their communications infrastructure, and proactively determine which network resources to upgrade or downgrade.

Figure 5:
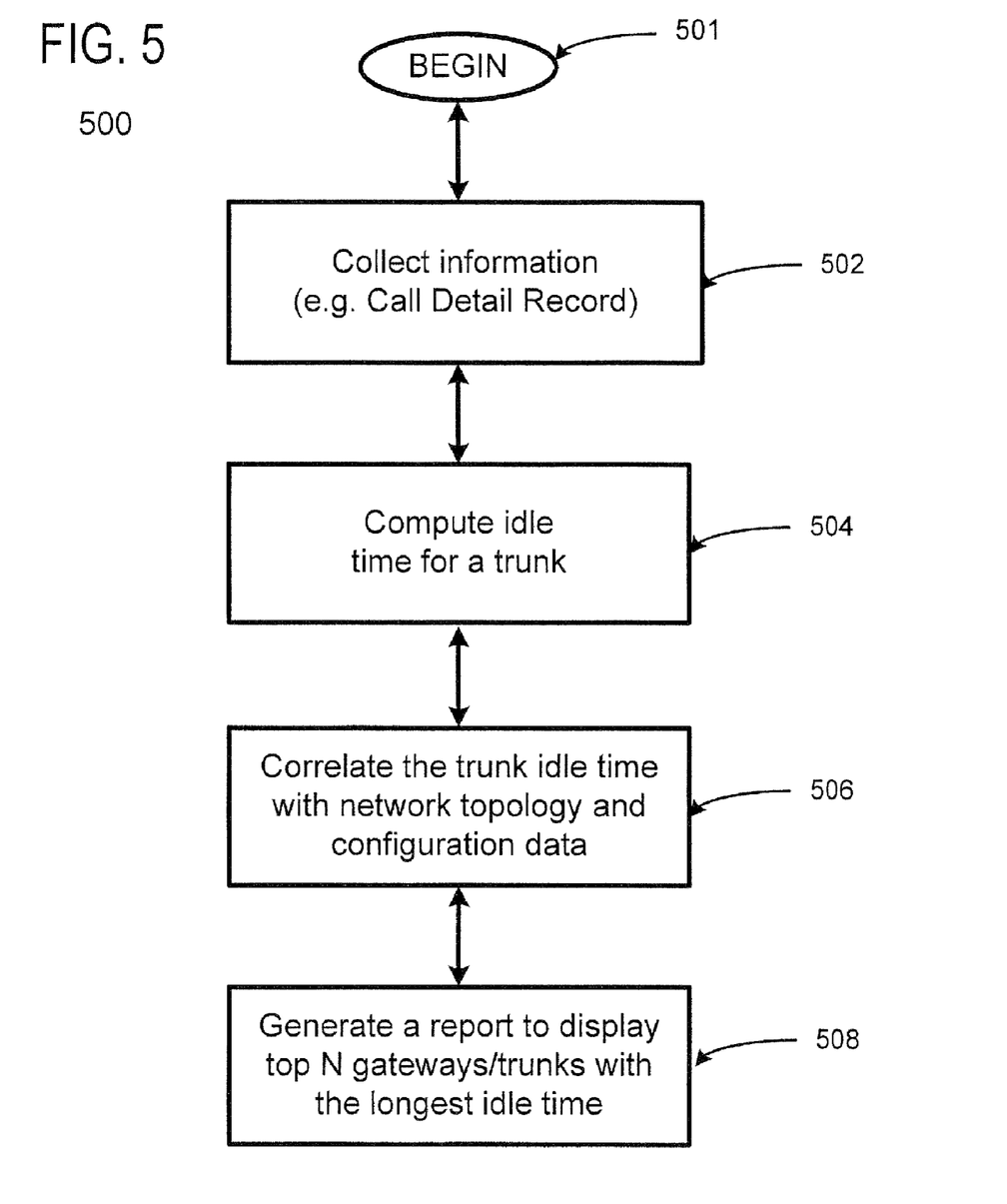
FIG. 5 is flow chart illustrating an example method for analyzing and reporting trunk idle time in the IP telephony system of FIG. 3.

FIG. 5 is flow chart illustrating an example method 500 for analyzing and reporting trunk idle time (i.e., the time since the last call on a given trunk) in the IP telephony system of FIG. 3. Method 500 begins at 501. At steps 502, information is collected on the gateways. Specifically, for MGCP gateways, Call Detail Records or CDR records can be searched on the origSpan, destSpan, origDevice, and destDevice information fields for the MGCP gateway from which the call originated or terminated. For H.323 gateways, CDR records can be searched on the origMediaTransportAddress_IP and destMediaTransportAddress_IP field to determine the time of last call originating or terminating on the gateway. At step 504, the idle time of a trunk is computed using the data collected. For example, the idle time of a trunk may be computed approximately from the sampling data for the utilization computation, or may be computed using the data collected from the Call Manager Call Detail Records or Call Management Record (CDR/CMR). At step 506, the idle time associated with a particular trunk is correlated with the network topology and configuration data obtained from a network management system (e.g., Cisco Unified Operations Manager) to identify backup trunks or gateways or dialing patterns that are routed over this trunk very infrequently. At step 508, the gateways/ trunks with the longest idle time are identified and a Top N (N is a subset of the total number of trunks or gateways in the network) longest idle time report is generated to inform the companies to reallocate expensive resources as necessary, or to even terminate service provider contracts for those under-utilized trunks and channels.

Some trunks in the network may have voice quality problems associated with them. It is important to identify these problematic trunks for troubleshooting and proactive resolution of problems before they impact the service quality.

Figure 6:
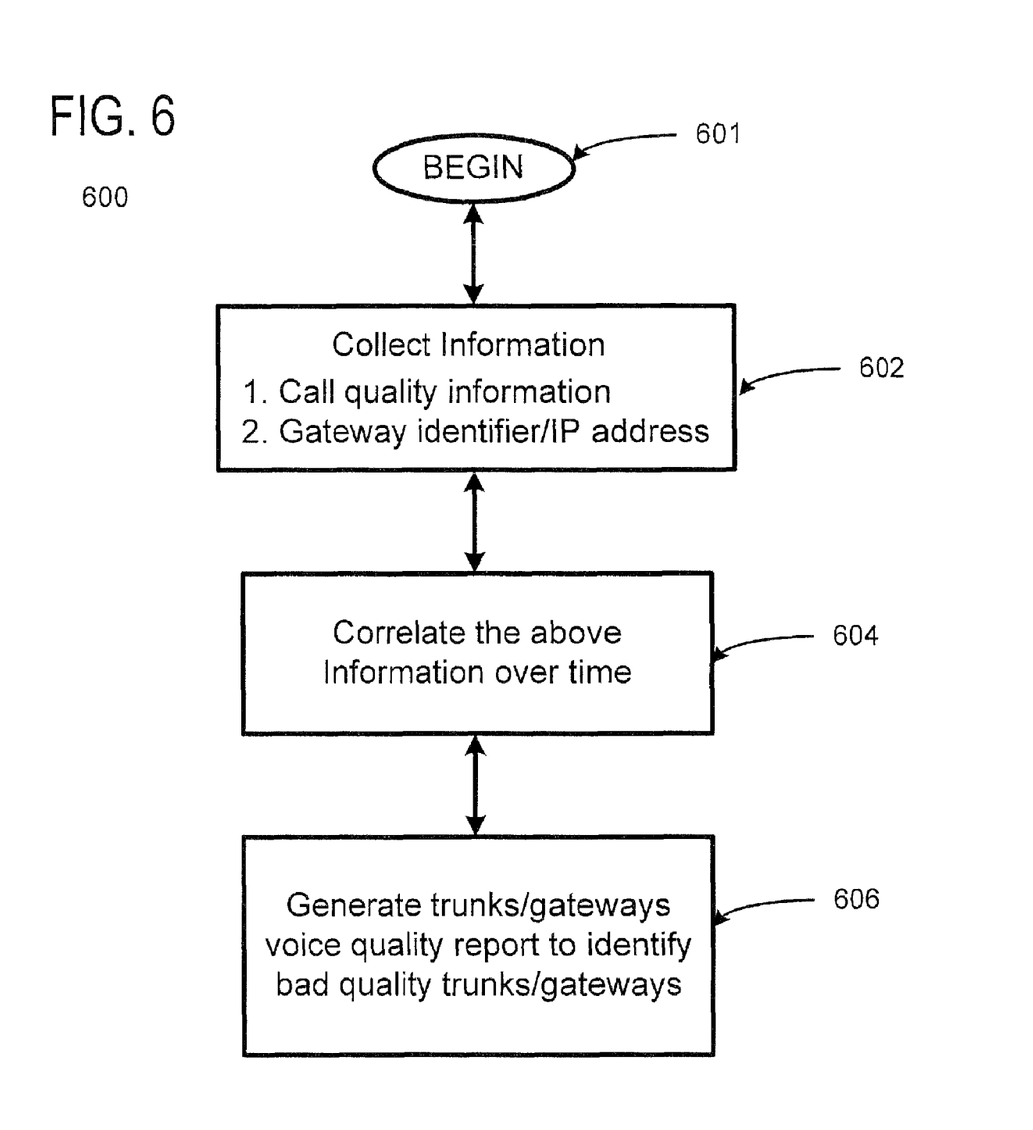
FIG. 6 is a flow chart illustrating an example method for identifying bad quality trunks or gateways in the IP telephony system of FIG. 3.

FIG. 6 is a flow chart illustrating an example method 600 for identifying bad quality trunks or gateways in the IP telephony system of FIG. 3. Method 600 begins at 601. At step 602, the information associated with a particular gateway or trunk is collected. The information may include the identifier or the IP address of the gateway or trunk, the call quality information associated with the particular trunk/gateway, etc. Specifically, for MGCP gateways, the gateway identifier is present in the origDevice and/or destDevice field of the CDR record. For H.323 gateways, the IP address of the gateway (if any) may be obtained from the origMediaTransportAddress_IP and/or destTransportAddress IP field of the CDR record. In one example implementation, the IP address of an H.323 gateway has to be validated with the Cisco Unified CallManager Configuration in order to ensure that the IP address references a H.323 gateway. The call quality information may be obtained from the Call Manager CMR record. At step 604, the call quality information is correlated with the network topology and configuration data (e.g., gateway/trunk identifier information) obtained from the network management system to identify whether there is a persistent voice quality problem associated with the particular gateway or trunk. At step 606, a trunk/gateway voice quality report is generated to identify the bad quality trunks/gateways for potential rectification or replacement. For example, Table 4 shows a trunk related daily voice quality report for all gateways in the IP telephony system of FIG. 3.

TABLE 4

Trunk-related Voice Quality Report for All Gateways in the network on Dec. 15, 2006

| Gateway | Trunk | Number of Calls | Duration (sec.) | Aggregate MOS for calls on trunk | Aggregate Packet loss % for calls on trunk | Aggregate Delay for calls on trunk (millisec.) | Aggregate Jitter for calls on trunk (millisec.) | Rank (1 = best) |
|---|---|---|---|---|---|---|---|---|
| 1 | TRK-12 | 2,302 | 25,832 | 3.20 | 1.12% | 48 | 3 | 5 |
| 1 | TRK-13 | 1,010 | 30,000 | 4.32 | 0.02% | 17 | 3 | 2 |
| 2 | 21 | 1,540 | 40,338 | 4.51 | 0.01% | 12 | 4 | 1 |
| 2 | 23 | 894 | 50,338 | 2.10 | 1.20% | 29 | 50 | 6 |
| 3 | 31 | 939 | 87,236 | 3.30 | 0.01% | 45 | 4 | 4 |
| 3 | 32 | 1217 | 77,214 | 3.47 | 0.01% | 24 | 4 | 3 |

Referring to Table 4, the call quality information associated with a particular trunk/gateway may include information such as aggregate packet loss percentage for calls on a trunk, aggregate delay for calls associated with the trunk, aggregate jitter for calls on the trunk, aggregate Mean Opinion Score (MOS), etc. Aggregate MOS provides a numerical indication of the perceived quality of received media after compression and/or transmission. The MOS score is expressed as a single number in the range of 1 to 5, where 1 represents the lowest perceived call voice quality and 5 represents the highest perceived call voice quality. The rightmost column in Table 4 ranks the overall voice quality for a particular trunk among all trunks, with 1 indicating the best quality. Alternatively, Table 5 shows the daily voice quality for top 2 worst call quality trunks (i.e., TRK-23 and TRK-13).

TABLE 5

Voice Quality (MOS) Report for Top 2 WORST Call Quality Trunks on Dec. 15, 2005

| Time | TRK-23 | TRK-12 |
|---|---|---|
| 12:00 AM | 3.77 | 3.47 |
| 1:00 AM | 3.78 | 3.21 |
| 2:00 AM | 3.52 | 3.07 |
| 3:00 AM | 3.29 | 3.71 |
| 4:00 AM | 3.43 | 3.98 |
| 5:00 AM | 3.51 | 3.73 |
| 6:00 AM | 3.66 | 3.60 |

TABLE 5-continued

Voice Quality (MOS)
Report for
Top 2 WORST Call Quality Trunks
on Dec. 15, 2005

| Time | TRK-23 | TRK-12 |
|---|---|---|
| 7:00 AM | 3.02 | 3.26 |
| 8:00 AM | 3.18 | 3.33 |
| 9:00 AM | 2.64 | 2.91 |
| 10:00 AM | 2.88 | 2.94 |
| 11:00 AM | 2.66 | 2.06 |
| 12:00 PM | 1.34 | 1.08 |
| 1:00 PM | 1.81 | 1.24 |

Finally, those of skill in the art will appreciate that the method and system described and illustrated herein may be implemented in software, firmware or hardware, or any suitable combination thereof. Preferably, the method and system are implemented in software, for purposes of low cost and flexibility. Thus, those of skill in the art will appreciate that the method and system may be implemented in logics encoded in one or more tangible media for execution in a machine. Alternative embodiments are contemplated, however, and are within the spirit and scope of the following claims.

Having described example embodiments, it should be apparent that a person skilled in the art can make modifications and variations in light of the above teachings. Therefore, any changes to the disclosed embodiments will be within the scope and the spirit of the claims.

The invention claimed is:

1. A method to identify and report over-utilized, under-utilized, and bad quality trunks and gateways in an Internet Protocol (IP) telephony network, which includes a plurality of gateways and trunks on the gateways, comprising:
   collecting information associated with operation of the plurality of gateways and trunks in the IP telephony network;
   computing traffic statistics associated with the plurality of gateways and trunks based on the collected information, wherein computing traffic statistics associated with the gateways and trunks further comprises:
      estimating number of days for the trunks on the gateways to reach 100% utilization of capacity using extrapolation and regression techniques; and
      computing trunk idle time;
   correlating the collected information and the traffic statistics with network topology and configuration data obtained from a network management system;
   identifying over-utilized, under-utilized, and bad quality trunks or gateways, if any; and
   generating a report to display the over-utilized, under-utilized, and bad quality trunks or gateways.

2. The method of claim 1, in which collecting information associated with the operation of the gateways and trunks on the gateways comprises collecting:
   active, completed, attempted, and overflow call volume; and
   actual trunk utilization.

3. The method of claim 1, in which collecting information associated with the operation of the gateways and trunks on the gateways comprises collecting Call Detail Record (CDR) information.

4. The method of claim 1, in which collecting information associated with the operation of the gateways and trunks on the gateways comprises collecting:
   call quality information associated with the plurality of gateways and trunks; and
   identifier or IP address associated with the plurality of gateways and trunks.

5. The method of claim 2, in which collecting active, completed, attempted, and overflow call volume comprises getting active, completed, attempted, and overflow call volume by polling Cisco Unified CallManager (CCM) Performance Objects for MGCP or H.323 gateways.

6. The method of claim 2, in which collecting actual trunk utilization comprises getting trunk utilization for MGCP gateways by polling Cisco MGCP gateways Performance Object on Cisco Unified CallManagers.

7. The method of claim 2, in which collecting actual trunk utilization comprises getting trunk and CPU utilization for H.323 gateways by polling Cisco H.323 gateway MIBs.

8. The method of claim 3, in which collecting Call Detail Record (CDR) information comprises searching on origSpan, destSpan, origDevice, and destDevice fields for MGCP gateways from which a call originated or terminated.

9. The method of claim 3, in which collecting Call Detail Record (CDR) information comprises searching on origMediaTransportAddress_IP and destMediaTransportAddress_IP fields for H.323 gateways.

10. The method of claim 1, further comprises estimating future capacity requirements for the trunks by correlating the number of days for the trunks to reach 100% capacity with overflow call volume.

11. The method of claim 1, further comprises generating a report on an hourly, weekly, monthly or yearly basis that correlates active, completed, attempted and overflow call volume with trunk utilization.

12. The method of claim 1, in which identifying over-utilized, under-utilized, and bad quality trunks or gateways comprises identifying over-utilized and under-utilized trunks or gateways by considering one or more of the following factors associated with the gateways and trunks:
   actual trunk utilization;
   active, completed, attempted, and overflow call volume;
   time of last call on the trunks;
   system utilization; and
   whether there is a violation of a user-defined Service Level Agreement (SLA) threshold.

13. The method of claim 12, in which identifying over-utilized, under-utilized, and bad quality trunks or gateways further comprises identifying a subset of the plurality of gateways and trunks for upgrade or downgrade.

14. The method of claim 4, in which the call quality information is obtained from the Call Manager Record (CMR) and comprises one or more of the following:
   aggregate Mean Opinion Score (MOS) for calls on the trunks;
   aggregate packet loss on the trunks;
   aggregate delay for calls on the trunks;
   aggregate jitter for calls on the trunks.

15. The method of claim 4, in which identifying over-utilized, under-utilized, and bad quality trunks or gateways comprises identifying bad quality trunks or gateways by correlating the call quality information associated with the gateways and trunks with the identifier or IP address associated with the same over a period of time, the identifier or IP address obtained from Call Detail Record (CDR).

16. The method of claim 1, in which generating a report to display the over-utilized, under-utilized, and bad quality trunks or gateways further comprises generating a report to display a subset of the plurality of gateways or trunks for potential upgrade or downgrade.

17. The method of claim 1, in which generating a report to display the over-utilized, under-utilized, and bad quality trunks or gateways further comprises generating a report to display a subset of the plurality of gateways or trunks with the longest idle time.

18. The method of claim 1, in which generating a report to display the over-utilized, under-utilized, and bad quality trunks or gateways further comprise generating a report to display a subset of the plurality of gateways or trunks with the worst voice quality.

19. The method of claim 1, in which correlating the collected information and the traffic statistics with network topology and configuration data obtained from a network management system comprises obtaining the network topology and configuration data from Cisco Unified Operations Manager.

* * * * *